(12) United States Patent
Gunther

(10) Patent No.: US 10,496,237 B2
(45) Date of Patent: Dec. 3, 2019

(54) COMPUTER-IMPLEMENTED METHOD FOR DESIGNING A THREE-DIMENSIONAL MODELED OBJECT

(71) Applicant: Dassault Systemes, Velizy Villacoublay (FR)

(72) Inventor: Mathieu Gunther, Le Chesnay (FR)

(73) Assignee: Dassault Systemes, Velizy Villacoublay (FR)

( * ) Notice: Subject to any disclaimer, the term of this patent is extended or adjusted under 35 U.S.C. 154(b) by 878 days.

(21) Appl. No.: 14/571,181

(22) Filed: Dec. 15, 2014

(65) Prior Publication Data

US 2015/0186007 A1 Jul. 2, 2015

(30) Foreign Application Priority Data

Dec. 30, 2013 (EP) .................................... 13306895

(51) Int. Cl.
*G06F 3/0481* (2013.01)
*G06F 3/0484* (2013.01)
(Continued)

(52) U.S. Cl.
CPC ...... *G06F 3/04815* (2013.01); *G06F 3/04842* (2013.01); *G06F 3/0488* (2013.01); *G06F 17/50* (2013.01); *G06F 2217/02* (2013.01)

(58) Field of Classification Search
CPC ............. G06F 3/04815; G06F 3/04842; G06F 3/0488; G06F 2217/02
See application file for complete search history.

(56) References Cited

U.S. PATENT DOCUMENTS 5,588,098 A 12/1996 Chen et al.
5,808,616 A * 9/1998 Shimizu .................. G06T 17/00
345/418
(Continued)

FOREIGN PATENT DOCUMENTS

EP 1059581 A2 12/2000

OTHER PUBLICATIONS

European Search Report, EP 13306895.7, dated Jun. 17, 2014.
(Continued)

*Primary Examiner* — William L Bashore
*Assistant Examiner* — Gregory A Distefano
(74) *Attorney, Agent, or Firm* — Hamilton, Brook, Smith & Reynolds, P.C.

(57) ABSTRACT

A computer-implemented method for designing a three-dimensional modeled object provides the three-dimensional modeled object in a three-dimensional scene; and displays a plane-shaped graphical tool (PSGT) defining a current working plane. The method points to and activates the plane-shaped graphical tool (PSGT) with a pointing element (PE). Without releasing the pointing element (PE), the method hovers the pointing element over a part of the three-dimensional modeled object and selects said part of the three-dimensional modeled object when releasing the pointing element (PE). The method extracts a working plane from the selected object at the current position of the pointing element and defines said plane as the current working plane represented by the plane-shaped graphical tool (PSGT). Lastly, a designing operation is performed in the current working plane.

10 Claims, 8 Drawing Sheets

(51) Int. Cl.
  *G06F 3/0488* (2013.01)
  *G06F 17/50* (2006.01)

(56) References Cited

U.S. PATENT DOCUMENTS

| | | | | |
|---|---|---|---|---|
| 6,308,144 | B1* | 10/2001 | Bronfeld | G06T 19/20 345/213 |
| 6,426,745 | B1* | 7/2002 | Isaacs | G06F 3/04845 345/419 |
| 6,762,778 | B1* | 7/2004 | Golibrodski | G06F 3/04845 715/782 |
| 6,822,662 | B1* | 11/2004 | Cook | G06F 3/04842 345/649 |
| 2003/0001906 | A1* | 1/2003 | Light | G06F 3/0481 715/849 |
| 2012/0001922 | A1* | 1/2012 | Escher | G06F 17/214 345/467 |
| 2012/0019531 | A1* | 1/2012 | Sabiston | A61F 2/5046 345/419 |
| 2012/0226983 | A1 | 9/2012 | Goldenberg et al. | |
| 2013/0127836 | A1* | 5/2013 | Joshi | G06T 11/203 345/419 |
| 2013/0181972 | A1 | 7/2013 | Fowler et al. | |
| 2013/0207965 | A1* | 8/2013 | Hori | G01N 21/9515 345/419 |
| 2014/0104266 | A1* | 4/2014 | Stone | G06F 17/50 345/419 |
| 2014/0320488 | A1* | 10/2014 | Ege | G06T 17/05 345/420 |

OTHER PUBLICATIONS

Kang, Y., et al., "Feature-based 3D CAD Modeling on Smart Device Using Multi-touch Gesture," *International Journal of CAD/CAM*, 13(2): 49-62 (2013).

Au, O. K., et al., "Multitouch Gestures for Constrained Transformation of 3D Objects," *Computer Graphics Forum*, 31(2 pt. 3): 651-660 (May 20, 2012).

* cited by examiner

COMPUTER-IMPLEMENTED METHOD FOR DESIGNING A THREE-DIMENSIONAL MODELED OBJECT

RELATED APPLICATION(S)

This application claims priority under 35 U.S.C. § 119 or 365 to European Application No. 13306895.7, filed Dec. 30, 2013. The entire teachings of the above application(s) are incorporated herein by reference.

TECHNICAL FIELD OF THE INVENTION

The invention relates to the field of computers programs and systems, and more specifically to the field of computer-implemented method for designing a three-dimensional (3D) modeled object in a 3D scene.

The present invention can belong to any field of technology using planes for designing 3D objects modeling (sketching, modeling, review, CAD . . . ). In particular, the product that can use it belongs to sketching field, such as the software provided by Dassault Systèmes under the trademark Natural Sketch. The present invention could be used in any three -dimensional-based CAD software where manipulators and selection (of objects in the three-dimensional scene) can coexist.

BACKGROUND OF THE INVENTION

Touch screens are commonly used in many electronic devices and systems to display text and/or modeled objects. They are also known as touch-screens, touchscreens or touch sensitive displays. The user is able to interact with a touch screen through a user interface comprising user interface objects. A touch screen device detects and responds to contact on the touch screen. Thus, the user is able to activate a function, trigger a process or manipulate modeled objects by contacting the touch screen with one finger, several fingers (multi-touch gesture) or a stylus at locations corresponding to the user interface objects he wants to interact with. A user interface object can be a soft key, a menu or a graphic. A gesture can be defined as a sequence of user-interactions for triggering a functionality.

In Natural Sketch the user needs to define a support plane, also called working plane or drawing plane, i.e. the plane on which the sketching is performed. Thus, offering quick ways to select an existing plane, or define a new one is essential. This is the purpose of a specific command, in the product Natural Sketch, for selecting and manipulating a working plane.

On desktop, in this command, there is a plane manipulator that the user can move to define a new plane from the current one. With a left click on an object, the user can select it by pick or by stroke, to retrieve its plane. By using a combination of the middle button and the left/right buttons of the mouse you can navigate in the three-dimensional scene (default CATIA navigation). A selection by stroke may be performed by drawing a continuous curve, that may be visible or not, with a "pointing element" on a screen. All selectable objects intersected by the stroke on the screen are automatically selected.

There are three different kinds of behavior, mapped on three different user actions. We rely on mouse modifiers or buttons (left/middle/right clicks) to differentiate these actions.

On touch only devices (as tablets or smartphones), where there is no button modifier, there is currently no application that allows to simultaneously navigate, manipulate and select an object in a three-dimensional environment.

To resume, in a classic desktop environment, everything works using a mouse:
  combination of middle click+left/right click to navigate;
  left click on the plane manipulator to move the plane;
  left click on an object outside the plane manipulator to select this object and retrieve its plane.

In the solutions of the state of the art, there are conflicts between gestures which can be quite similar, on the one hand to manipulate the point of view of the scene and on the other hand to select a working plane from a selected object.

It is possible to map each behavior (navigation/manipulation/selection) to a different user action. These actions are simple enough to offer a very intuitive and productive workflow.

On tablet devices, however, the fact that there is no mouse (touch only) implies a number of limitations that impacts this workflow:
  No mouse over (moving the mouse without click), thus the user cannot prehighlight the selection; and
  No button, thus the user cannot have different behaviors based on which button is clicked. Thus the user cannot have both curve selection and 3D navigation at the same time (achieve with the middle click modifier on desktop).

SUMMARY OF THE INVENTION

In the select command, navigation is essential to be able to quickly define a new drawing plane. Thus it must be the default action when the user does not manipulate the plane manipulator. The invention addresses the aforementioned drawbacks by allowing the user to select an existing curve without a selection manipulator.

The purpose of this invention is to solve these conflicts. The invention should allow the user to Navigate/Manipulate and Select an object, especially on a touch only device as easily and intuitively as possible.

An aim of the invention is to provide a computer-implemented method and a system to overcome the above mentioned problems.

It is proposed, according to one aspect of the invention, a computer-implemented method for designing a three-dimensional modeled object comprising the steps of:
  providing the three-dimensional modeled object in a three-dimensional scene;
  displaying a plane-shaped graphical tool defining a current working plane;
  pointing and activating the plane-shaped graphical tool with a pointing element;
  without releasing the pointing element, hovering a part of the three-dimensional modeled object;
  selecting said part of the three-dimensional modeled object when releasing the pointing element;
  extracting a working plane from the selected object at the current position of the pointing element and defining said plane as the current working plane represented by the plane-shaped graphical tool; and
  performing a designing operation in the current working plane.

Such a method allows to map each behavior (navigation/manipulation/selection) to a different user action. These actions are simple enough to offer a very intuitive and productive workflow.

Thus, it is possible to select an existing curve without using a selection manipulator, and more precisely to navigate/manipulate and select an object as easily and intuitively as possible.

According to an embodiment, the plane-shaped graphical tool is transformed in a selection graphical tool when activated, until the release of the pointing element, with a different representation.

Thus, the activation of the plane-shaped graphical tool causes its transformation in a selection graphical tool, and allows the user to easily and automatically select a part of the three-dimensional modeled object and extract a working plane from the selected object. The activation can be made with a long hold on a touch screen, or with pressing and holding down a mouse button.

The change of representation allows the user to easily know if the graphical tool is the selection graphical tool.

According to an embodiment, the selection graphical tool is partially transparent.

According to an embodiment, the step of extracting a working plane from the selected object at the current position of the pointing element and defining said plane as the current working plane represented by the plane-shaped graphical tool uses the plane normal to the object at the current position of the pointing element.

It is also proposed, according to another aspect of the invention, a computer-readable medium having computer-executable instructions to cause the computer system to perform the method for designing a three-dimensional modeled object as described above.

It is also proposed, according to another aspect of the invention, a computer program product, stored on a computer readable medium, comprising code means for causing the system to take the steps of the method for designing a three-dimensional modeled object as described above.

It is also proposed, according to another aspect of the invention, an apparatus for designing a three-dimensional modeled object comprising means for implementing the steps of the method for designing a three-dimensional modeled object as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein.

DETAILED DESCRIPTION OF THE INVENTION

A description of example embodiments of the invention follows.

The teachings of all patents, published applications and references cited herein are incorporated by reference in their entirety.

Following figures explain more in details the functioning of the present invention.

In the present description, a three-dimensional model object is an object represented in 3D, i.e. with a representation, based on data, for displaying an object in any perspective in a 3D scene.

The three-dimensional modeled object is related to a physical product to be manufactured in the real world subsequent to the completion of its virtual design with a CAD solution. This physical product may be an industrial product such as a mechanical product, for instance a mechanical part but not limited to. A CAD solution allows the design of products in various and unlimited industrial fields: aerospace, architecture, construction, consumer goods, high-tech devices, industrial equipment, transportation, marine, offshore or transportation.

Following figures represent a non-limiting example of the method of the invention.

In the present application, the pointing element illustrated is a finger on a touch screen, but it can also be any other pointing element such as a mouse or a pen.

Figure 1:
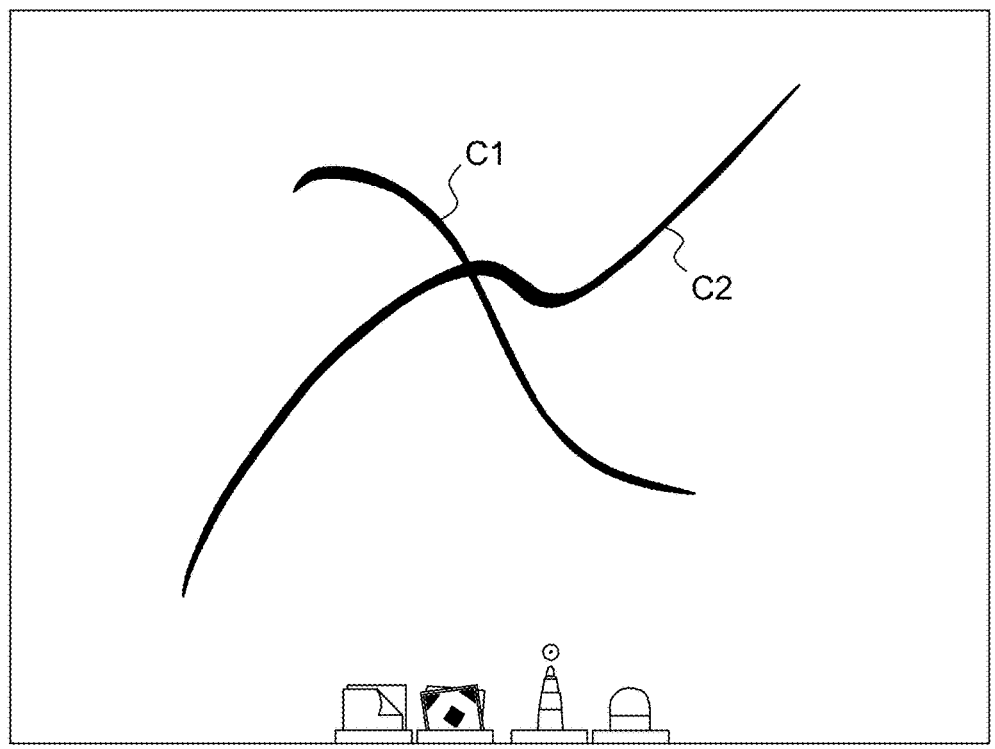
FIGS. 1 to 11 illustrate the method according to an aspect of the invention.

FIG. 1 illustrates a 3D modeled object being designed. The 3D modeled object comprises simple modeled objects such as a first curve C1 and a second curve C2, to clearly illustrate a method according to an aspect of the invention. The present method of course applies to more complex 3D objects.

Figure 2:
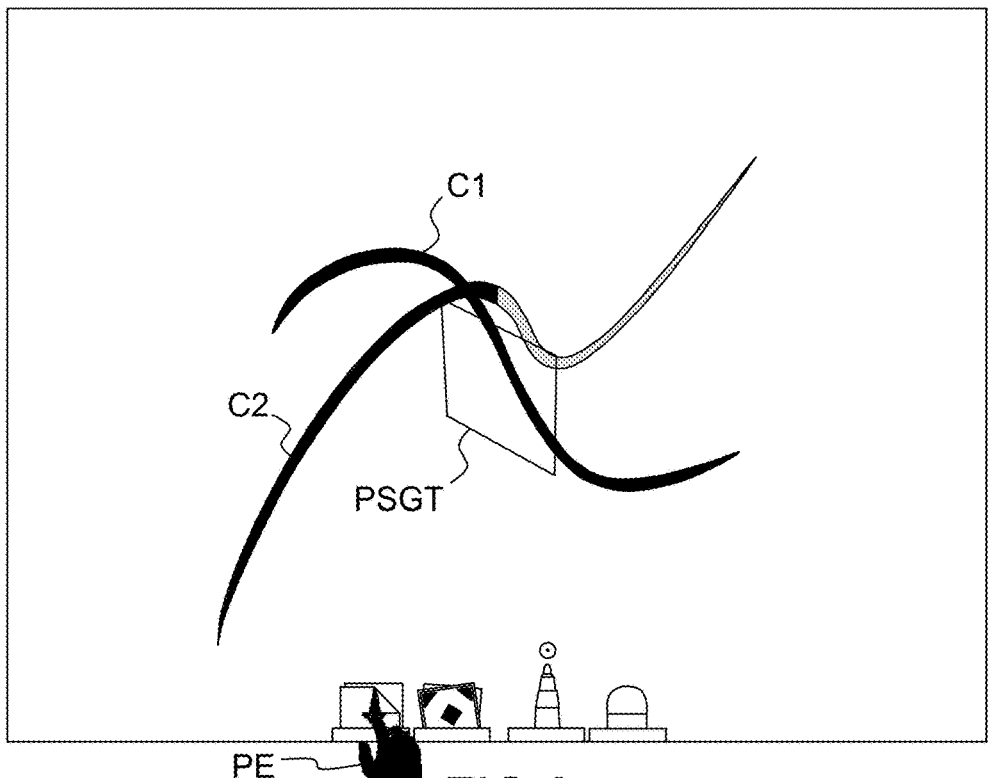

FIG. 2 illustrates a launching of a plane manipulator or plane-shaped graphical tool PSGT defining a current working plane or drawing plane, with a launch select command. On the present example, the plane-shaped graphical tool PSGT is rectangular.

Figure 3:
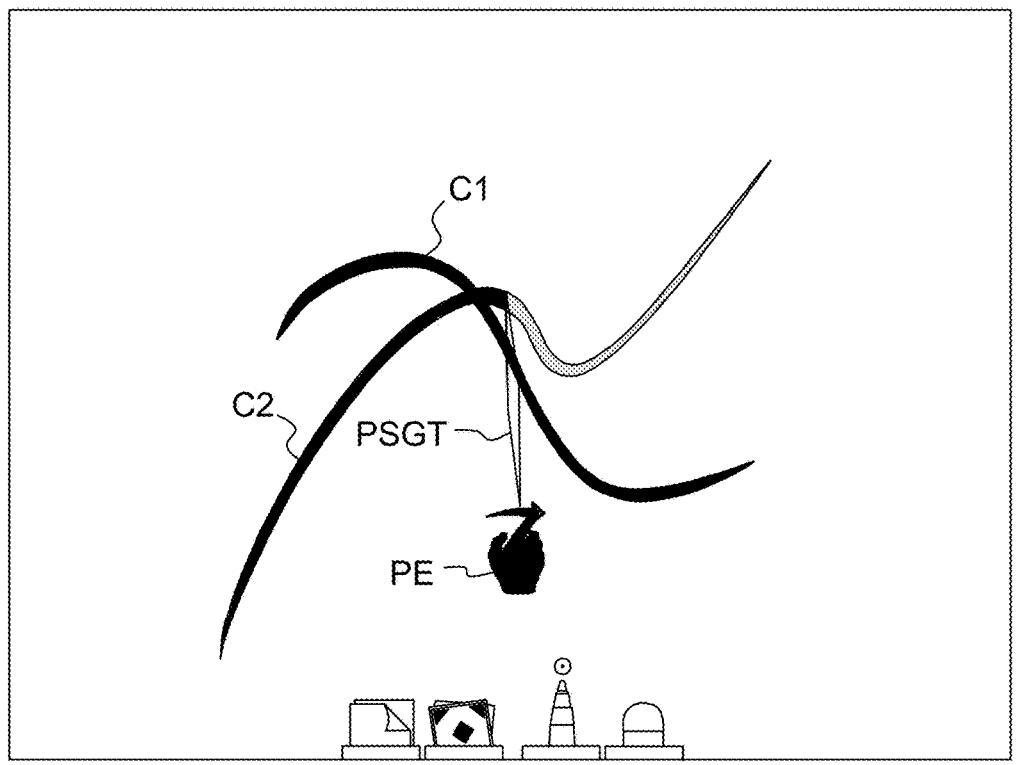

FIG. 3 illustrates a modification of the drawing plane thanks to the plane-shaped graphical tool PSGT. On the present example, the drawing plane is rotated with the edge of the plane-shaped graphical tool PSGT, through an operation of drag and release of the edge of the plane-shaped graphical tool PSGT, performed with the pointing element PE.

Figure 4:
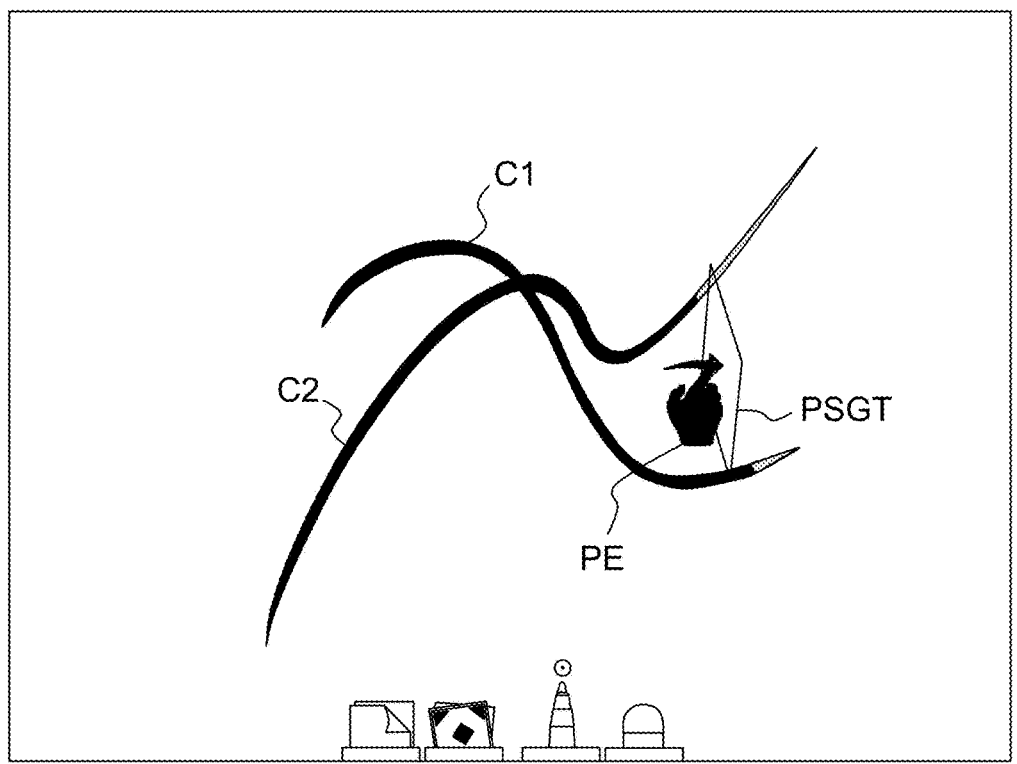

On FIG. 4 is illustrated a modification of the drawing plane thanks to the plane-shaped graphical tool PSGT. On the present example, the drawing plane is translated with a single touch in the plane-shaped graphical tool surface PSGT.

Figure 5:
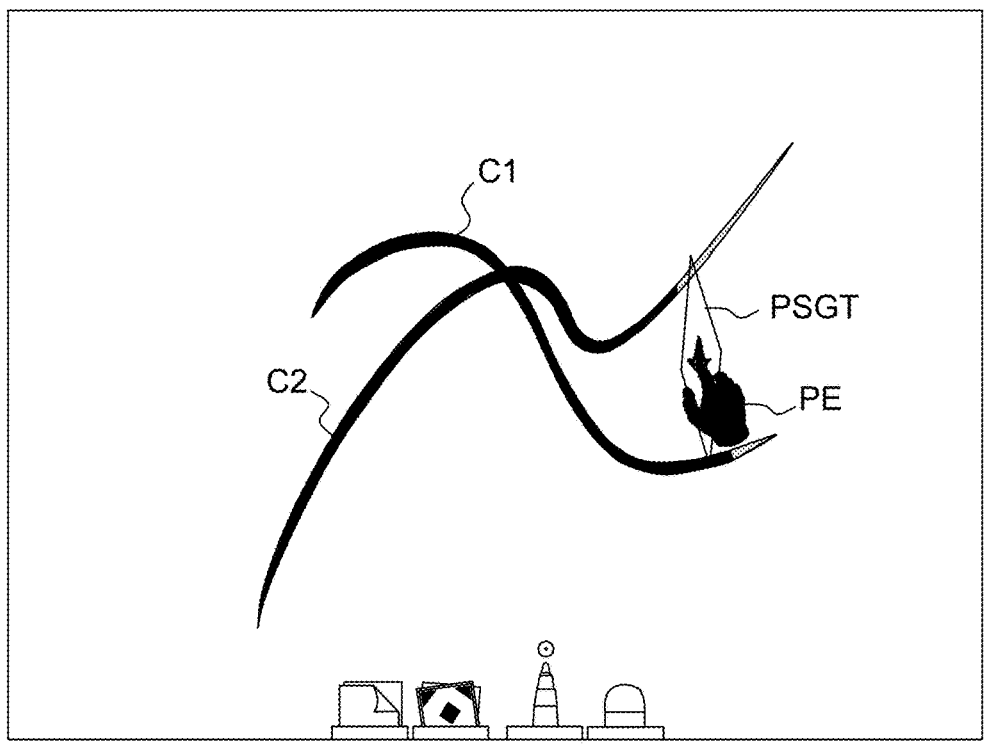

On FIG. 5, the user wants to use the plane of the first curve C1, thus he starts with a long hold on the plane-shaped graphical tool PSGT. A long hold can be described as a contact of the pointing element PE within an activation zone associated to the plane-shaped graphical tool PSGT maintained without being released, for a period of time equal to or in excess of a threshold time limit.

Figure 6:
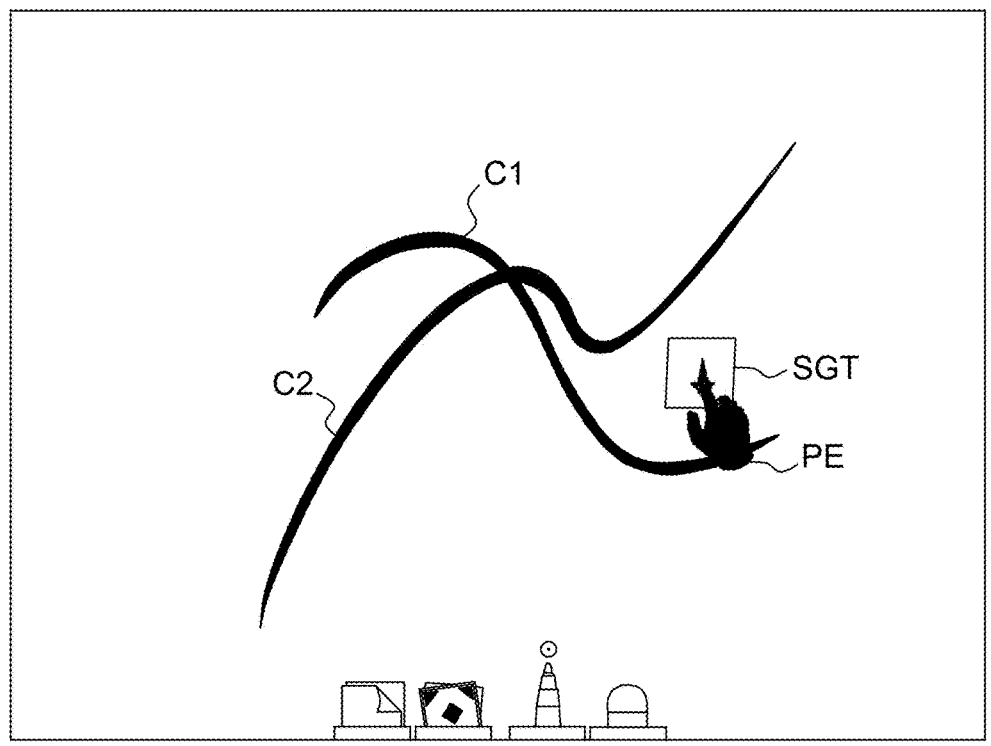

Thus, when such a long hold is performed, as illustrated on FIG. 6, the plane-shaped graphical tool PSGT is transformed in a selection graphical tool SGT, represented, in the present example by a smaller rectangle. For example, the selection graphical tool SGT can be partly transparent.

Figure 7:
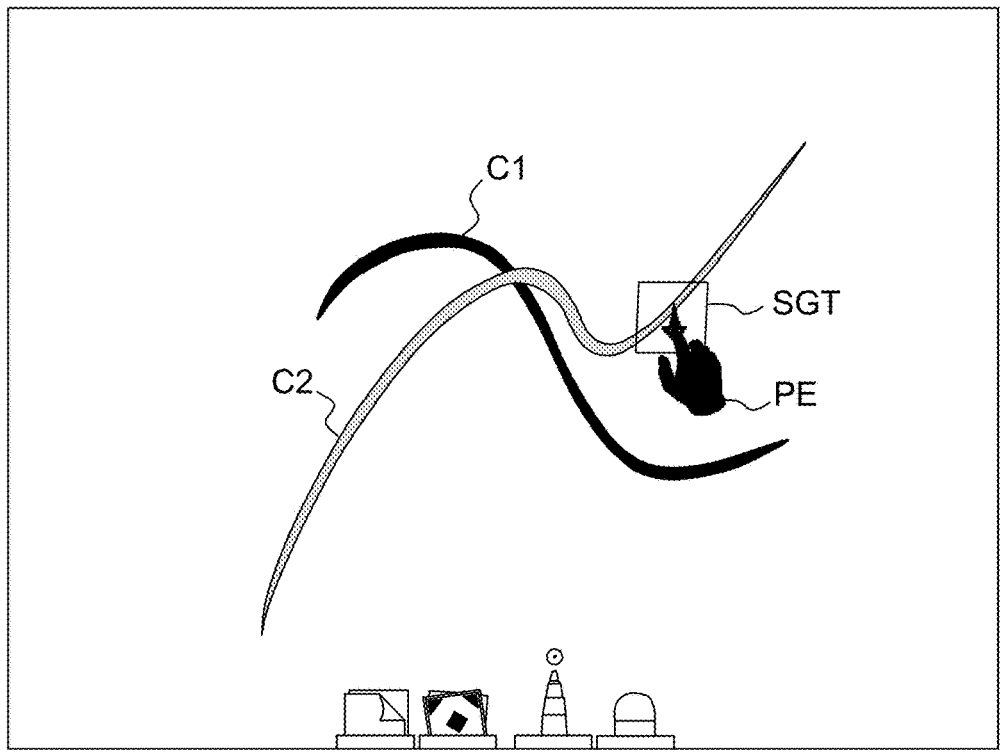

On FIG. 7, without releasing the pointing element PE, the user moves the selection graphical tool SGT around, and for example, a pre-highlight, or a color change, or any other visual indication can indicates which curve would be selected, in the present example the curve C1.

Figure 8:
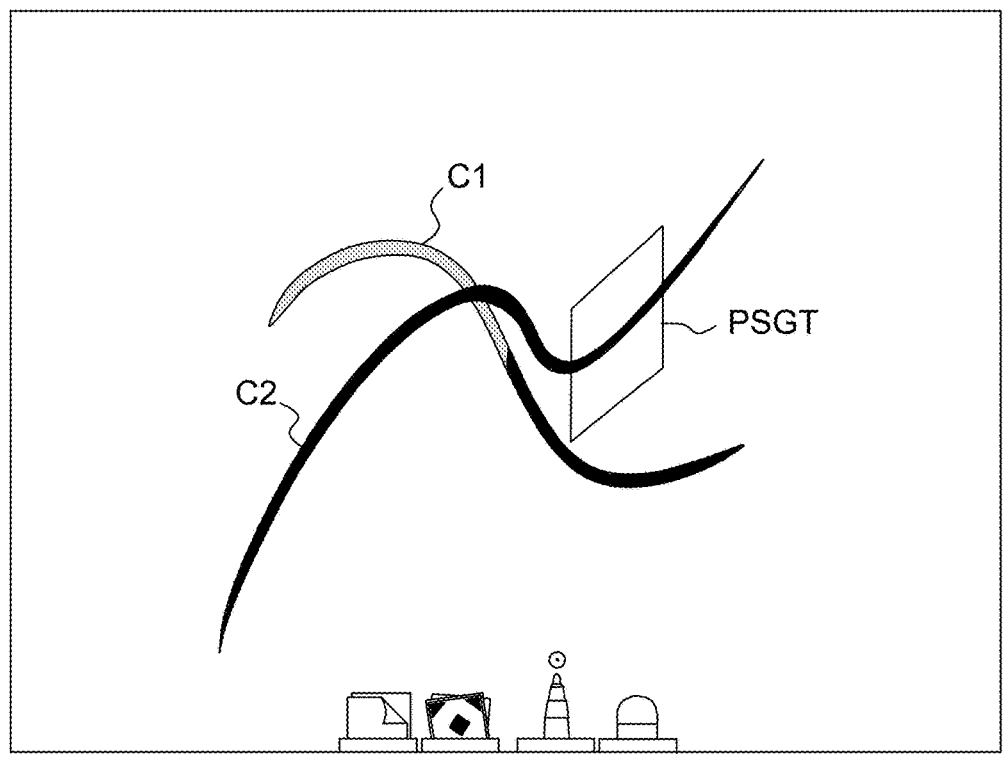

Thus, when the pointing element PE is released, as represented on FIG. 8, the C1 curve's plane is retrieved, and the plane-shaped graphical tool PSGT is positioned accordingly. The extraction of the working plane of the object at the current position of the pointing element and the definition of said plane as the current working plane represented by the plane-shaped graphical tool (PSGT) can be made using the plane normal to the object at the current position of the pointing element.

Alternatively, it is possible to extract the plane attribute on the object.

Figure 9:
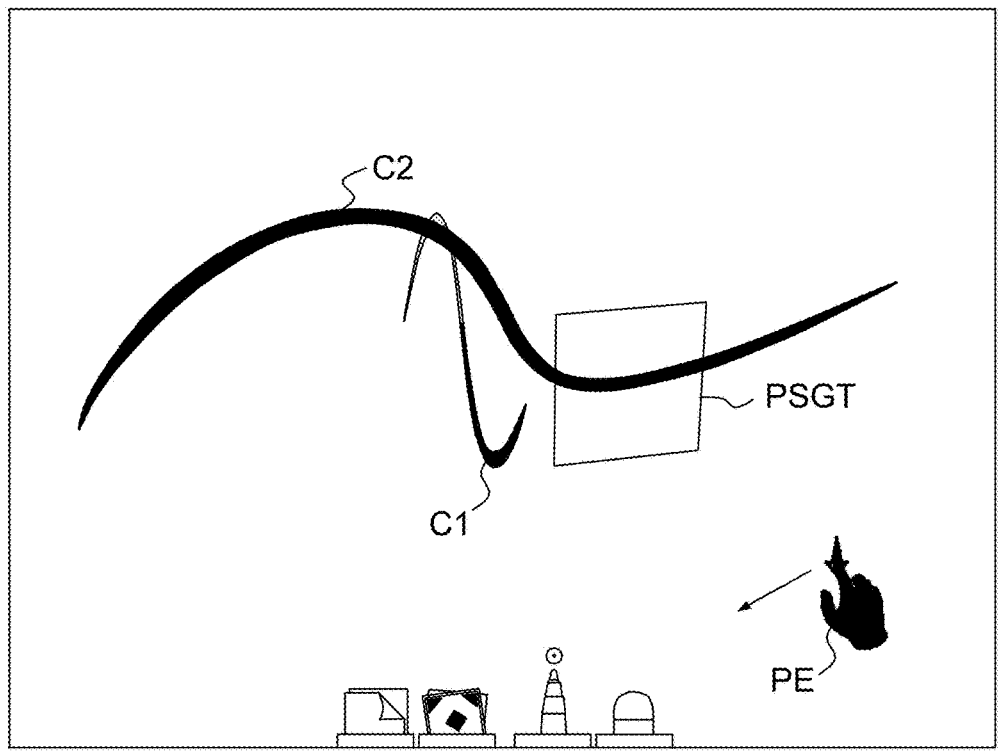

Then, as illustrated on FIG. 9, the user can navigate in the three dimensional scene by manipulating outside the manipulator. Here the user rotates the viewpoint using the pointing element, in this case the finger of the user.

Figure 10:
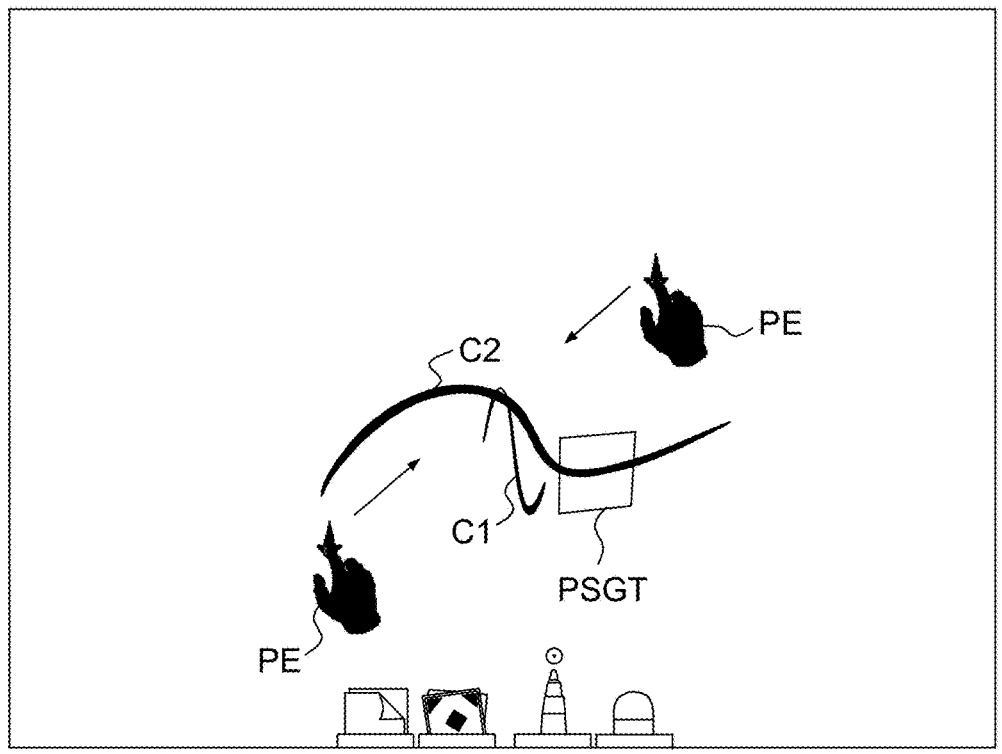

As illustrated on FIG. 10, a zoom in or zoom out can be made, for example using a pinch gesture on a multi-touch screen with two fingers corresponding to two pointing elements PE.

Figure 11:
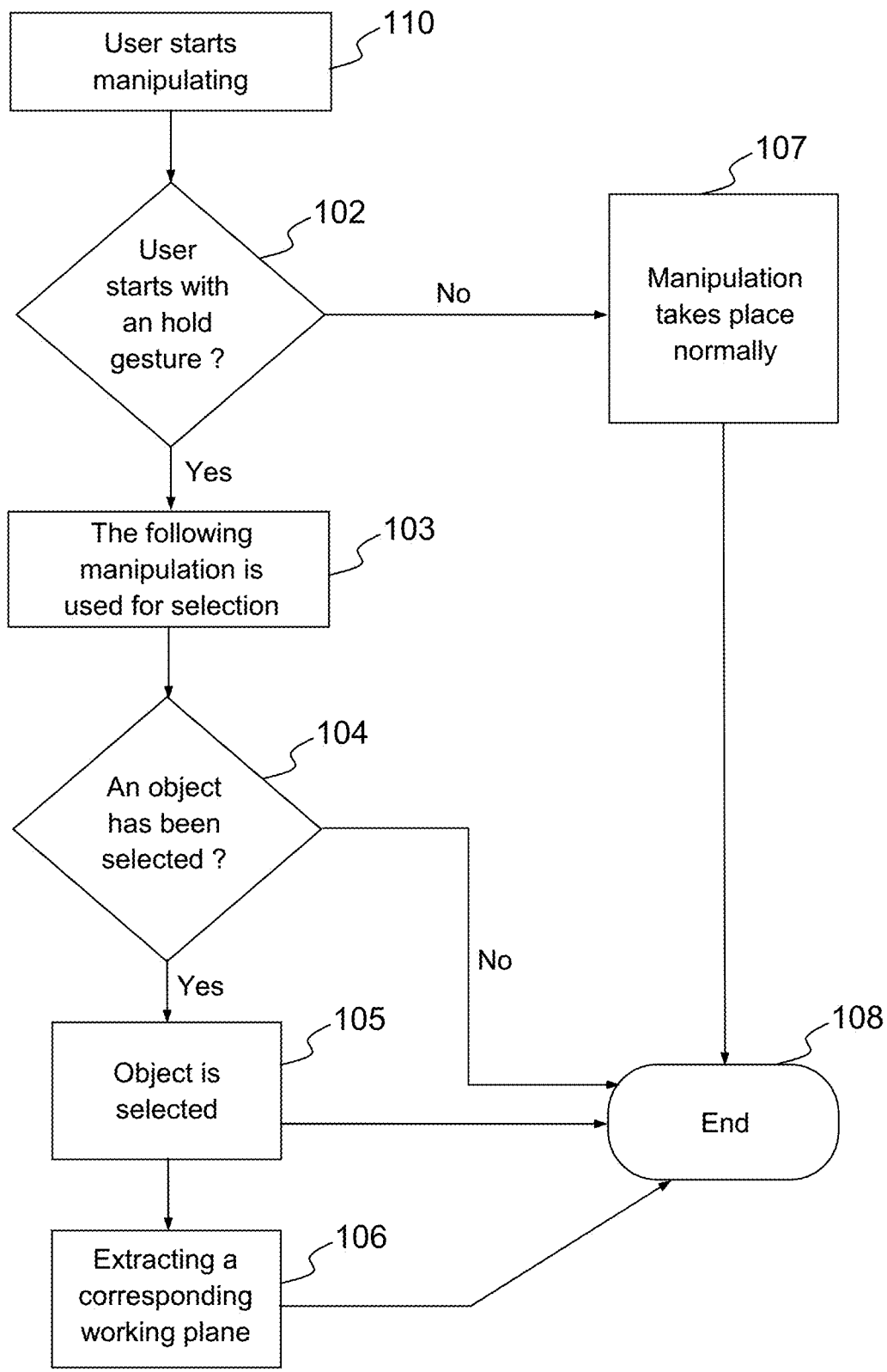

On FIG. 11, is represented, an embodiment of the method according to an aspect of the invention.

The user starts manipulating, in a step 101, a three-dimensional modeled object in a three-dimensional scene.

A test 102 is performed to check if the user starts with a hold gesture on the plane-shaped graphical tool PSGT with a pointing element PE.

If the test 102 is positive, the following manipulation 103 is used for selection, and a test 104 is performed to test if an object has been selected.

If the test 104 is positive, a part of the object is selected 105 when releasing the pointing element PE, and then a working plane is extracted from the selected part of the object.

Then, when the extraction 106 is ended, the manipulation is ended 108, as if the step 104 is negative.

If the test 102 is negative, the manipulation takes place normally 107 and ends 108.

Figure 12:
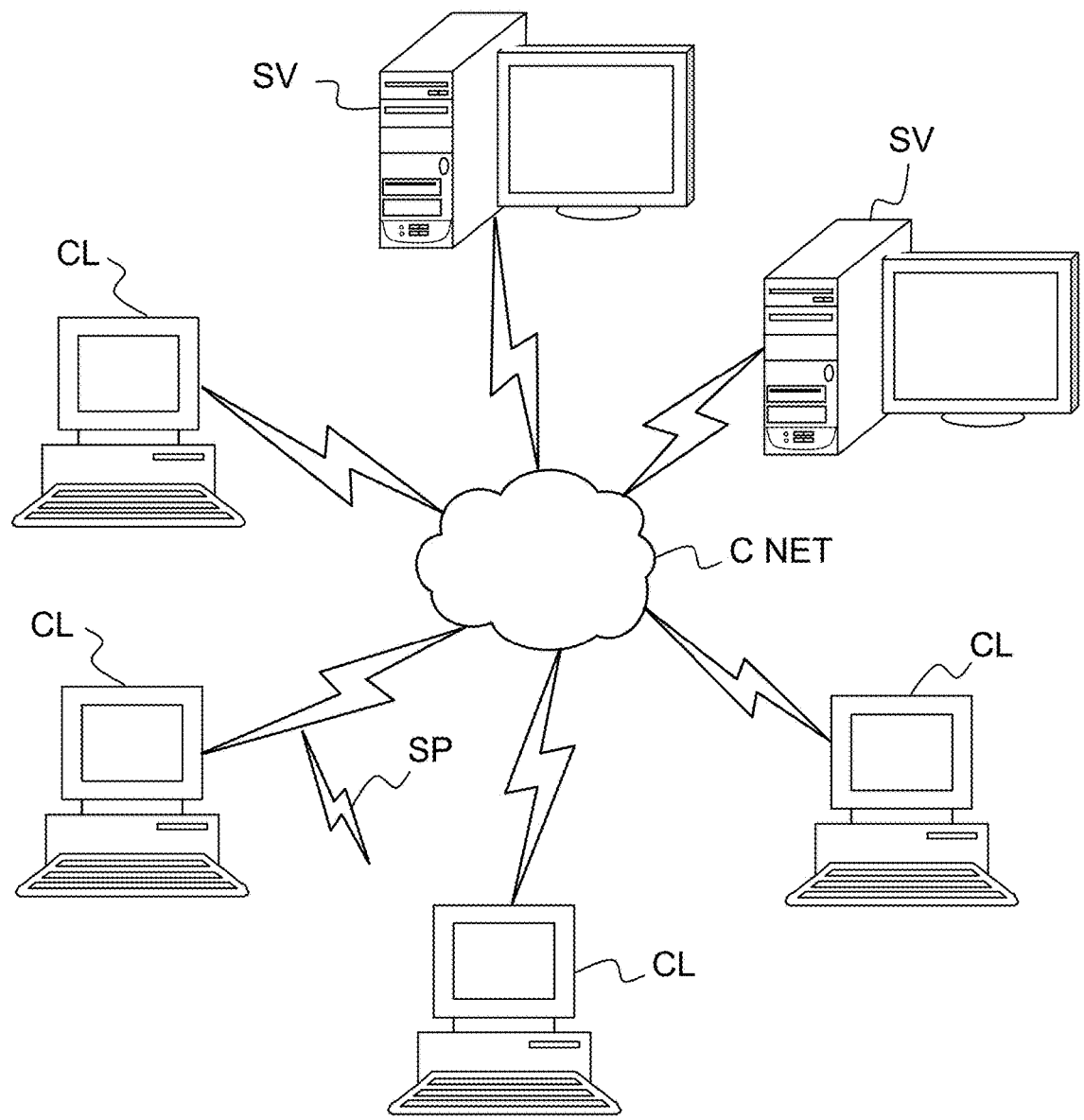
FIG. 12 illustrates a computer network or similar digital processing environment in which the present invention may be implemented.

FIG. 12 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 13:
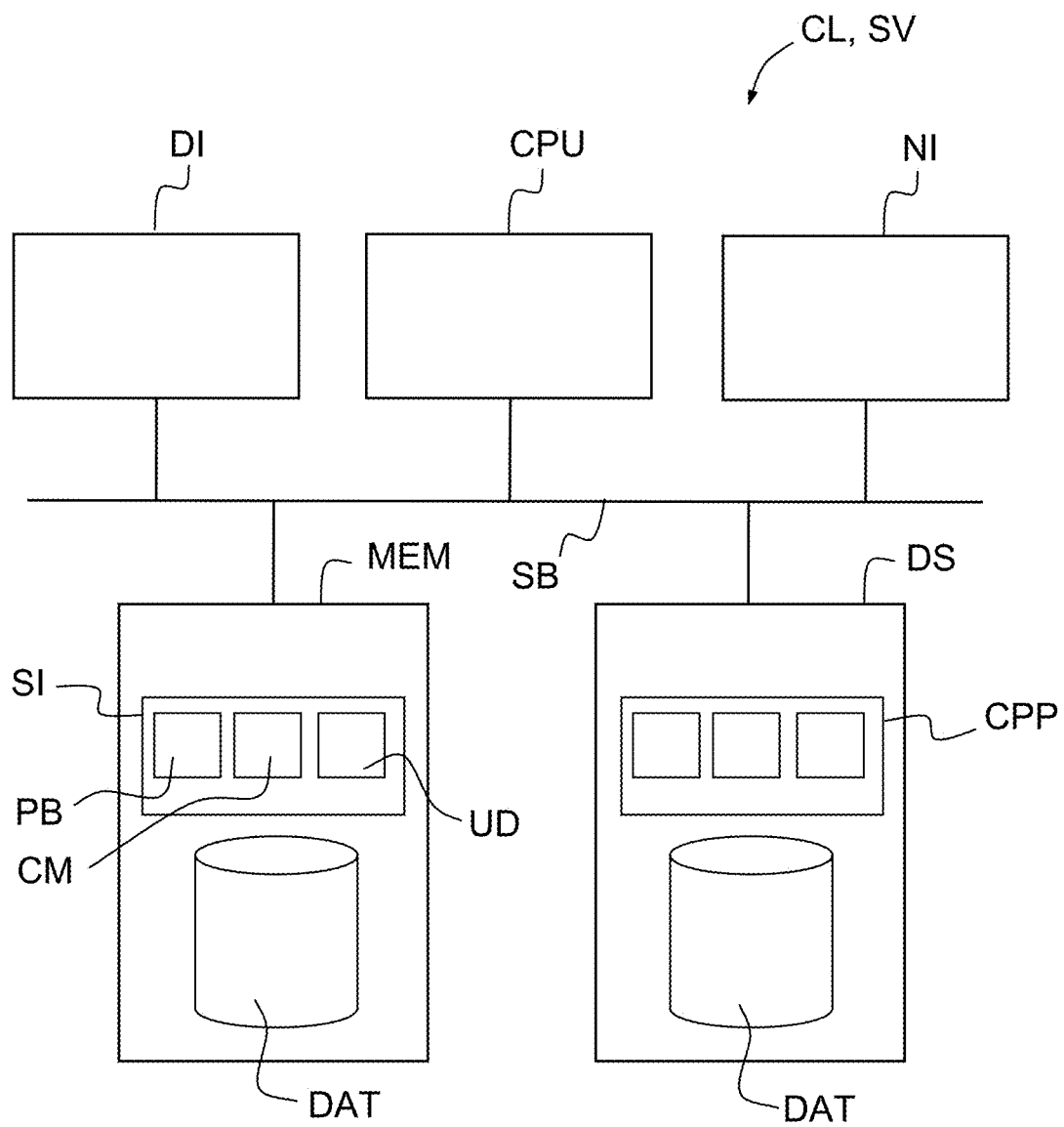
FIG. 13 illustrates a diagram of the internal structure of a computer.

FIG. 13 is a diagram of the internal structure of a computer (e.g., client processor/device CL or server computers SV) in the computer system of FIG. 12. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 12).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 11, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer. activated on the screen, and for example by projecting them on the drawing plane (when the drawing plane is different from the screen plane). Thus, the stroke corresponds to the user-interacting (S1) in the sense that it is derived from what is sketched by the user through the user-interacting. Thus, in a sense, the stroke is sketched by the user through the user-interacting (S1). As a result, the definition of the stroke is entirely life-like, the support virtually corresponding here to the drawing paper (the paper being virtually orthogonally faced by the designer when the support is the screen plane).

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a three-dimensional modeled object comprising the steps of:
   providing the three-dimensional modeled object in a three-dimensional scene;
   displaying a plane-shaped graphical tool (PSGT) defining a current drawing plane;
   pointing and activating the plane-shaped graphical tool (PSGT) with a pointing element (PE);
   detecting a contact of the pointing element (PE) within an activation zone associated to the plane-shaped graphical tool (PSGT);
   if said contact is released before a threshold period of time, modifying the drawing plane, comprising rotating the drawing plane and/or translating the drawing plane, and defining said modified drawing plane as the current drawing plane represented by the plane-shaped graphical tool (PSGT);
   if said contact is maintained, without being released, for a period of time equal to or in excess of said threshold period of time:
     without releasing the pointing element (PE), hovering a part of the three-dimensional modeled object,
     selecting said part of the three-dimensional modeled object when releasing the pointing element (PE), and
     extracting a drawing plane from the selected object at the current position of the pointing element and defining said extracted drawing plane as the current drawing plane represented by the plane-shaped graphical tool (PSGT); and
   performing a sketching operation in the current drawing plane.

2. The computer-implemented method of claim 1, wherein the plane-shaped graphical tool (PSGT) is transformed in a selection graphical tool (SGT) when activated, until the release of the pointing element (PE), with a different representation.

3. The computer-implemented method of claim 1, wherein the selection graphical tool (SGT) is partially transparent.

4. The computer-implemented method of claim 1, wherein the step of extracting a drawing plane of the part and defining said plane as the current drawing plane represented by the plane-shaped graphical tool (PSGT) uses the plane normal to the object at the current position of the pointing element.

5. A non-transitory computer-readable medium comprising:
   a computer memory system having computer-executable instructions to cause a computer system to design a three-dimensional modeled object;
   the instructions including instructions to:
     provide the three-dimensional modeled object in a three-dimensional scene;
     display a plane-shaped graphical tool (PSGT) defining a current drawing plane;
     point and activate the plane-shaped graphical tool (PSGT) with a pointing element (PE);
     detect a contact of the pointing element (PE) within an activation zone associated to the plane-shaped graphical tool (PSGT);
     if said contact is released before a threshold period of time, modify the drawing plane, comprising rotating the drawing plane and/or translating the drawing plane, and define said modified drawing plane as the current drawing plane represented by the plane-shaped graphical tool (PSGT);
     if said contact is maintained, without being released, for a period of time equal to or in excess of said threshold period of time:
       without releasing the pointing element (PE), hover a part of the three-dimensional modeled object,
       select said part of the three-dimensional modeled object when releasing the pointing element (PE), and
       extract a drawing plane from the selected object at the current position of the pointing element and defining said extracted drawing plane as the current drawing plane represented by the plane-shaped graphical tool (PSGT); and
     perform a sketching operation in the current drawing plane.

6. A computer program product comprising:
   a non-transitory computer readable medium storing instructions for designing a three-dimensional modeled object; and
   the instructions causing one or more computers to design the three-dimensional modeled object by:
     providing the three-dimensional modeled object in a three-dimensional scene;
     displaying a plane-shaped graphical tool (PSGT) defining a current drawing plane;
     pointing and activating the plane-shaped graphical tool (PSGT) with a pointing element (PE);
     detecting a contact of the pointing element (PE) within an activation zone associated to the plane-shaped graphical tool (PSGT);
     if said contact is released before a threshold period of time, modifying the drawing plane, comprising rotating the drawing plane and/or translating the drawing plane, and defining said modified drawing plane as the current drawing plane represented by the plane-shaped graphical tool (PSGT);
     if said contact is maintained, without being released, for a period of time equal to or in excess of said threshold period of time:
       without releasing the pointing element (PE), hovering a part of the three-dimensional modeled object,
       selecting said part of the three-dimensional modeled object when releasing the pointing element (PE), and
       extracting a drawing plane from the selected object at the current position of the pointing element and defining said extracted drawing plane as the current drawing plane represented by the plane-shaped graphical tool (PSGT); and
     performing a sketching operation in the current drawing plane.

7. An apparatus for designing a three-dimensional modeled object comprising:
   a digital processor; and
   a memory operatively coupled to the processor instructing the processor to:
     provide the three-dimensional modeled object in a three-dimensional scene;
     display a plane-shaped graphical tool (PSGT) defining a current drawing plane;
     point and activate the plane-shaped graphical tool (PSGT) with a pointing element (PE);

detect a contact of the pointing element (PE) within an activation zone associated to the plane-shaped graphical tool (PSGT);

if said contact is released before a threshold period of time, modify the drawing plane, comprising rotating the drawing plane and/or translating the drawing plane, and define said modified drawing plane as the current drawing plane represented by the plane-shaped graphical tool (PSGT);

if said contact is maintained, without being released, for a period of time equal to or in excess of said threshold period of time:

without releasing the pointing element (PE), hover a part of the three-dimensional modeled object, select said part of the three-dimensional modeled object when releasing the pointing element (PE), and extract a drawing plane from the selected object at the current position of the pointing element and defining said extracted drawing plane as the current drawing plane represented by the plane-shaped graphical tool (PSGT); and perform a sketching operation in the current drawing plane.

8. The apparatus of claim 7 wherein the plane-shaped graphical tool (PSGT) is transformed in a selection graphical tool (SGT) when activated, until the release of the pointing element (PE), with a different representation.

9. The apparatus of claim 8 wherein the selection graphical tool (SGT) is partially transparent.

10. The apparatus of claim 7 wherein the processor extracting a drawing plane of the part and defining said plane as the current drawing plane represented by the plane-shaped graphical tool (PSGT) uses the plane normal to the object at the current position of the pointing element.

* * * * *